United States Patent [19]

Staiger et al.

[11] 3,937,691

[45] Feb. 10, 1976

[54] MANUFACTURE OF POLY (α-OLEFINS)

[75] Inventors: Gerhard Staiger, Bobenheim-Roxheim; Klaus Bronstert, Carlsberg; Hannes Schick, Mannheim; Peter Hennenberger; Heinz Mueller-Tamm, both of Ludwigshafen, all of Germany

[73] Assignee: Badische Anilin- & Soda-Fabrik Aktiengesellschaft, Ludwigshafen (Rhine), Germany

[22] Filed: May 30, 1973

[21] Appl. No.: 365,218

[30] Foreign Application Priority Data

May 30, 1972 Germany............................ 2226167

[52] U.S. Cl......... 260/93.7; 252/429 B; 260/94.9 C
[51] Int. Cl.$^2$...................... C08F 4/66; C08F 10/06
[58] Field of Search... 260/94.9 B, 94.9 C, 94.9 CA, 260/94.9 CB, 94.9 E

[56] References Cited
UNITED STATES PATENTS

| | | | |
|---|---|---|---|
| 3,032,510 | 5/1962 | Tornqvist et al................ | 260/94.9 C |
| 3,241,913 | 3/1966 | Fowler............................... | 260/93.7 |
| 3,451,768 | 6/1969 | Luciani et al...................... | 260/93.7 |
| 3,530,107 | 9/1970 | Yoshioka et al................... | 260/93.7 |
| 3,560,146 | 2/1971 | Luciani et al..................... | 260/94.9 B |
| 3,573,270 | 3/1971 | Trementozzi et al. .......... | 260/94.9 B |
| 3,639,375 | 1/1972 | Staiger et al..................... | 260/94.9 C |
| 3,701,763 | 10/1972 | Wada et al..................... | 260/94.9 B |

FOREIGN PATENTS OR APPLICATIONS 2,056,749   7/1971   Germany

*Primary Examiner*—Edward J. Smith
*Attorney, Agent, or Firm*—Johnston, Keil, Thompson & Shurtleff

[57] ABSTRACT

A process for the manufacture of poly(α-olefins) by polymerization of α-olefins using a catalyst system comprising (1) a titanium-containing component of (1.1) a substance of the formula $TiCl_3 \cdot 1/3\ AlCl_3$ and (1.2) an organic electron donor containing phosphorus atoms and/or nitrogen atoms, ground together with said substance (1.1), and (2) an aluminum-containing component of a substance of formula $Al(C_nH_{2n+1})_3$ or $Al(C_nH_{2n+1})_2Cl$, where $n$ is an integer of from 2 to 6. The characteristic feature is that the catalyst system used is one in which the component (1.1) has been ground with component (1.2) without the use of auxiliaries or additives in a vibratory ball mill using specific steel balls and a specific grinding acceleration over a specific period of time at a temperature which is just below that at which the particles in the ground material begin to agglomerate. The advantage of this process is that the efficiency of the catalyst system is very high and/or poly(α-olefins) are obtained which have a particularly large fraction which is insoluble in boiling n-heptane.

5 Claims, No Drawings

MANUFACTURE OF POLY ($\alpha$-OLEFINS)

The present invention relates to a process for the manufacture of poly($\alpha$-olefins) by polymerizing $\alpha$-olefins at temperatures of from 0° to 150°C and pressures of from 1 to 100 atm. absolute using a catalyst system comprising (1) a titanium-containing component of (1.1) a substance of the formula $TiCl_3 \cdot 1/3 AlCl_3$ having a maximum particle diameter of 2 mm and (1.2) an organic electron donor containing phosphorus and/or nitrogen atoms and ground together with the substance of said formula $TiCl_3 \cdot 1/3 AlCl_3$ (1.1) to form a complex compound, and (2) an aluminum-containing component of a substance of the formula $Al(C_nH_{2 \cdot n+1})_3$ or $Al(C_nH_{2 \cdot n+1})_2Cl$ or a mixture thereof, where $n$ is an integer of from 2 to 6, provided that the molar ratio of titanium in said substance of formula $TiCl_3 \cdot 1/3 AlCl_3$ (1.1) to the electron donor (1.2) is from 10:5 to 10:1 and the molar ratio of titanium in said substance of formula $TiCl_3 \cdot 1/3 AlCl_3$ (1.1) to the aluminum-containing component (2) is from 10:5 to 10:300.

Known processes of this kind are superior to comparable prior art processes of different kinds particularly in that the efficiency of the catalyst system is relatively high and the resulting polypropylene contains a relatively large fraction which is insoluble in boiling n-heptane.

It is an object of the present invention to provide a process of the above kind in which the effeciency of the catalyst system and/or the proportion of the resulting polyolefin which is insoluble in n-heptane may be increased still further.

We have found that this object is achieved if the process is carried out using a catalyst system in which grinding of the substance of formula $TiCl_3 \cdot 1/3 AlCl_3$ (1.1) with the electron donor (1.2) has been carried out under specific conditions, particularly specific temperature conditions.

Accordingly, the present invention relates to a process for the manufacture of poly($\alpha$-olefins) by polymerization of $\alpha$-olefins at temperatures of from 0° to 150°C and and pressures of from 1 to 100 atm. absolute using a catalyst system comprising (1) a titanium-containing component of (1.1) a substance of the formula $TiCl_3 \cdot 1/3 AlCl_3$ having a maximum particle diameter of 2 mm and (1.2) an organic electron donor containing phosphorus atoms and/or nitrogen atoms and ground together with said substance of formula $TiCl_3 \cdot 1/3 AlCl_3$ (1.1) to form a complex compound therewith, and (2) an aluminum-containing component of a substance of a formula $Al(C_nH_{2 \cdot n+1})_3$ or $Al(C_nH_{2 \cdot n+1})Cl$ or a mixture thereof, where n is an integer of from 2 to 6, provided that the molar ratio of titanium in the substance of formula $TiCl_3 \cdot 1/3 AlCl_3$ (1.1) to the electron donor (1.2) is from 10:5 to 10:1 and the molar ratio of titanium in the substance of formula $TiCl_3 \cdot 1/3 AlCl_3$ (1.1) to the aluminum-containing component (2) is from 10:5 to 10:300. The process of the invention is characterized in that a catalyst system is used in which grinding of the material of formula $TiCl_3 \cdot 1/3 AlCl_3$ (1.1) with the electron donor (1.2) has been carried out without the use of auxiliaries or additives in a vibratory ball mill using steel balls having a diameter of from 6 to 60 mm and preferably from 15 to 35 mm and at a grinding acceleration of from 30 to 70 and preferably from 40 to 60 m.sec$^{-2}$ over a period of time of from 10 to 70 and at a temperature of from 4° to 10°C and preferably from 5° to 8°C below the temperature at which the particles in the ground material begin to agglomerate.

The following comments relate to the substances used in our novel process.

A. The $\alpha$-olefins to be polymerized should, as usual, be substantially pure. Suitable $\alpha$-olefins are, in particular, $C_{3-6}$ $\alpha$-olefins, especially propene, butene-1, 4-methylpentene-1 and hexene-1. The $\alpha$-olefins may be used singly or as a mixture of two or more $\alpha$-olefins for the manufacture of copolymers.

B. The substance of formula $TiCl_3 \cdot 1/3 AlCl_3$ (1.1) is that frequently used in the polymerization of $\alpha$-olefins and is commercially available.

C. Suitable electron donors (1.2) are also commonly used organic substances having phosphorus atoms and/or nitrogen atoms. Such electron donors are described for example in U.S. Pat. No. 3,186,977, Austrian Pat. Nos. 279,157; 285,932 and 285,933, and German Published Application Nos. 1,595,303; 2,052,525 and 2,056,749. Examples of highly suitable electron donors are phosphines and phosphine oxides and also primary, secondary and tertiary amines each having from 2 to 21 carbon atoms.

The main electron donors which are suitable are, for example, triphenylphosphine, triphenylphosphine oxide, triisopropylphosphine, tri-n-butylphosphine, tri-n-butylphosphine oxide, hexamethylphosphoric triamide, pyridine, $\gamma$-picoline and dimethylamine, trimethylamine, butylamine, dibutylamine, diisobutylamine, tributylamine, diphenylamine, dicyclohexylamine, dimethylaniline, dibutylaniline, dimethylcyclohexylamine, dibutylcyclohexylamine, dibenzylamine and tribenzylamine.

D. Suitable substances of formula $Al(C_nH_{2 \cdot n+1})_3$ and $Al(C_nH_{2 \cdot n+1})Cl$ (2) are those commonly used, particularly those in the formulae of which n is an integer of from 2 to 4. Particular examples of very suitable substances of this kind are aluminum triisobutyl, aluminum triethyl, aluminum diethyl chloride and mixtures thereof.

Our novel process may be carried out in conventional manner, apart from the special feature of the invention, for example as outlined in the publications listed under (C) above.

The special feature of the invention consists in the use of a catalyst system in which grinding of the substance of formula $TiCl_3 \cdot 1/3 AlCl_3$ (1.1) with the electron donor (1.2) has been carried out without the use of auxiliaries or additives in a vibratory ball mill using steel balls having a diameter of from 6 to 60 mm and preferably from 15 to 35 mm and at a grinding acceleration of from 30 to 70 and preferably of from 40 to 60 m.sec$^{-2}$ over a period of time ranging from 10 to 70 and preferably from 20 to 50 hours and at a temperature which is from 4° to 10°C and preferably from 5° to 8°C below that temperature at which the particles in the ground material begin to agglomerate.

The above critical conditions must be satisfied in all respects if the novel process is to represent the advance desired. The most critical factor is the temperaturecondition, which states, in fact, that grinding should be carried out at a temperature which is as high as possible but not so high that the particles begin to agglomerate. The most suitable temperatures for each electron donor may be simply determined empirically, for example by commencing grinding, in a preliminary test, at relatively low temperatures and slowly raising the temperature during grinding until a temperature is reached at which the particles in the ground material begin to agglomerate. The following is a list of suitable grinding temperature (±2°C) for some selected electron donors: dibutylamine 40°C, diisobutylamine 35°C, tributylamine 45°C, dicyclohexylamine 60°C, dibutylaniline 45°C, dimethylcyclohexylamine 50°C, dibenzylamine 40°C, hexamethylphosphoric triamide 40°C, triphenylphosphine 50°C, triphenylphosphine oxide 50°C, tri-n-butylphosphine 10°C and tri-n-butylphosphine oxide 5°C.

EXAMPLE 1

A catalyst system is used which consists of (1) a titanium-containing component of (1.1) a substance of the formula $TiCl_3 \cdot 1/3AlCl_3$ having a maximum particle diameter of 2 mm and (1.2) triphenylphosphine oxide as electron donor which is ground together with the substance of formula $TiCl_3 \cdot 1/3AlCl_3$ (1.1) to form a complex compound therewith and (2) an aluminum-containing component of a substance of formula $Al(C_nH_{2 \cdot n+1})_2Cl$, where n is the integer 2, the molar ratio of titanium in the substance of formula $TiCl_3 \cdot 1/3AlCl_3$ (1.1) to the electron donor (1.2) being 10:1.666 and the molar ratio of titanium in the substance of formula $TiCl_3 \cdot 1/3AlCl_3$ to the aluminum-containing component (2) being 10:25.

The special feature of this catalyst system is that grinding of the substance of formula $TiCl_3 \cdot 1/3AlCl_3$ (1.1) with the electron donor (1.2) was carried out without the use of auxiliaries or additives in a vibratory ball mill using steel balls having a diameter of 25 mm at a grinding acceleration of 50 m.sec$^{-2}$ over a period of time of 30 hours and at a temperature (50°C) which is 5°C below the temperature at which the particles in the ground material begin to agglomerate.

Polymerization itself is carried out as follows: 1 part by weight of the titanium-containing component (1) is added, together with 1.2 parts by weight of the aluminum diethyl chloride (2) and 6,000 parts by volume of liquid propylene, to a pressure-tight reactor fitted with a stirrer. After the addition of 10,000 parts by volume (STP) of hydrogen (for control of molecular weight) polymerization is continued for 3 hours at 65°C. The reactor is then vented to give 1,900 parts of polypropylene of which a fraction of 94.5% is insoluble in boiling heptane.

EXAMPLE 2

A catalyst system is used which consists of (1) a titanium-containing component of (1.1) a substance of the formula $TiCl_3 \cdot 1/3AlCl_3$ having a maximum particle diameter of 2 mm and (1.2) tri-n-butylphosphine as electron donor which is ground together with the substance of formula $TiCl_3 \cdot 1/3AlCl_3$ (1.1) to form a complex compound therewith and (2) an aluminum-containing component of a substance of formula $Al(C_nH_{2 \cdot n+1})_2Cl$, where n is the integer 2, the molar ratioof titanium in the substance of formula $TiCl_3 \cdot 1/3AlCl_3$ (1.1) to the electron donor (1.2) being 10:1.666 and the molar ratio of titanium in the substance of formula $TiCl_3 \cdot 1/3AlCl_3$ to the aluminum-containing component (2) being 10:25.

The special feature of this catalyst system is that grinding of the substance of formula $TiCl_3 \cdot 1/3AlCl_3$ (1.1) with the electron donor (1.2) was carried out without the use of auxiliaries or additives in a vibratory ball mill using steel balls having a diameter of 25 mm at a grinding acceleration of 50 m.sec$^{-2}$ over a period of time of 30 hours and at a temperature (10°C) which is 5°C below the temperature at which the particles in the ground material begin to agglomerate.

Polymerization itself is carried out as follows: 1 part by weight of the titanium-containing component (1) is added, together with 1.2 parts by weight of the aluminum diethyl chloride (2) and 6,000 parts by volume of liquid propylene, to a pressure-tight reactor fitted with a stirrer. After the addition of 10,000 parts by volume (STP) of hydrogen (for control of molecular weight) polymerization is continued for 3 hours at 65°C. The reactor is then vented to give 2,200 parts of polypropylene of which a proportion of 95.8% is insoluble in boiling heptane.

EXAMPLE 3

A catalyst system is used which consists of (1) a titanium-containing component of (1.1) a substance of the formula $TiCl_3 \cdot 1/3AlCl_3$ having a maximum particle diameter of 2 mm and (1.2) tri-n-butylphosphine as electron donor which is ground together with the substance of formula $TiCl_3 \cdot 1/3AlCl_3$ (1.1) to form a complex compound therewith and (2) an aluminum-containing component of a substance of formula $Al(C_nH_{2 \cdot n+1})_2Cl$, where n is the integer 2, the molar ratio of titanium in the substance of formula $TiCl_3 \cdot 1/3AlCl_3$ (1.1) to the electron donor (1.2) being 10:1.666 and the molar ratio of titanium in the substance of formula $TiCl_3 \cdot 1/3AlCl_3$ to the aluminum-containing component (2) being 10:25.

The special feature of this catalyst system is that grinding of the substance of formula $TiCl_3 \cdot 1/3AlCl_3$ (1.1) with the electron donor (1.2) was carried out without the use of auxiliaries or additives in a vibratory ball mill using steel balls having a diameter of 25 mm at a grinding acceleration of 50 m.sec$^{-2}$ over a period of time of 30 hours and at a temperature (10°C) which is 5°C below the temperature at which the particles in the ground material begin to agglomerate.

Polymerization itself is carried out as follows: 1 part by weight of the titanium-containing component (1) is added, together with 1.2 parts by weight of the aluminum diethyl chloride (2) and 6,000 parts by volume of liquid butene-1, to a pressure-tight reactor fitted with a stirrer. After the addition of 3,000 parts by volume (STP) of hydrogen (for control of molecular weight) polymerization is continued for 3 hours at 65°C. The reactor is then vented to give 2,800 parts of polybutene of which a proportion of 96.5% is insoluble in boiling diethyl ether.

We claim:

1. In a process for the manufacture of poly($\alpha$-olefins) by polymerization of $\alpha$-olefins at temperatures of from 0° to 150°C and pressures of from 1 to 100 atm. absolute using a catalyst system comprising (1) a titanium-containing component of (1.1) a substance of the formula $TiCl_3 \cdot 1/3AlCl_3$ having a maximum particle diameter of 2 mm and (1.2) an organic electron donor containing phosphorus atoms and/or nitrogen atoms and ground together with said substance of formula $TiCl_3 \cdot 1/3AlCl_3$ (1.1) to form a complex compound therewith, and (2) an aluminum-containing component of a substance of a formula $Al(C_nH_{2 \cdot n+1})_3$ or $Al(C_nH_{2 \cdot n+1})_2Cl$ or a mixture thereof, where $n$ is an integer of from 2 to 6, provided that the molar ratio of titanium in the substance of formula $TiCl_3 \cdot 1/3AlCl_3$ (1.1) to the electron donor (1.2) is from 10:5 to 10:1 and the molar ratio of titanium in the substance of formula $TiCl_3 \cdot 1/3AlCl_3$ (1.1) to the aluminum-containing component (2) is from 10:5 to 10:300, the improvement consisting essentially of using as said catalyst system a system in which grinding of the substance of formula $TiCl_3.1/3AlCl_3$ (1.1) with the electron donor (1.2) has been carried out without the use of auxiliaries or additives in a vibratory ball mill using steel balls having a diameter of from 6 to 60 mm and at a grinding acceleration of from 30 to 70 m.sec$^{-2}$ over a period of time of from 10 to 70 hours at a temperature which is from 4° to 10°C below the temperature at which the particles in the ground material begin to agglomerate.

2. A process as set forth in claim 1 wherein grinding temperature is from 5° to 8°C below at which the particles in the ground material begin to agglomerate.

3. A process as set forth in claim 2 wherein said grinding acceleration is from 40 to 60 m.sec$^{-2}$ and wherein the grinding period is from 20 to 50 hours.

4. A process as set forth in claim 1 wherein said electron donor is selected from the group consisting of phosphines, phosphine oxides and primary, secondary and tertiary amines each having from 2 to 21 carbon atoms.

5. A process as set forth in claim 1 wherein said electron donor is selected from the group consisting of triphenylphosphine, triphenylphosphine oxide, triisopropylphosphine, tri-n-butylphosphine, tri-n-butylphosphine oxide, hexamethylphosphoric triamide, pyridine, γ-picoline, dimethylamine, trimethylamine, butylamine, dibutylamine, diisobutylamine, tributylamine, diphenylamine, dicyclohexylamine, dimethylaniline, dibutylaniline, dimethylcyclohexylamine, dibutylcyclohexylamine, dibenzylamine and tribenzylamine.

* * * * *